May 7, 1957     C. T. WALLIS     2,790,990
WINDSHIELD WIPER ARM ASSEMBLY
Filed Oct. 15, 1953
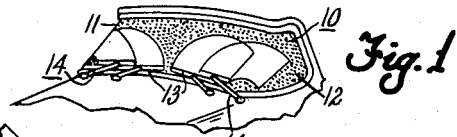
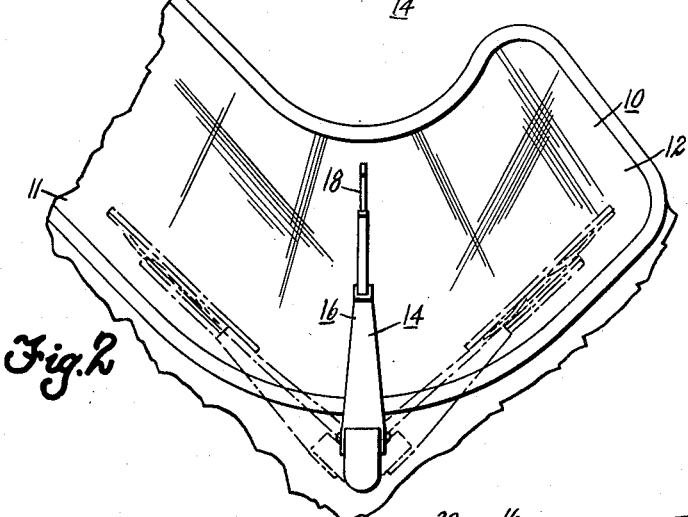
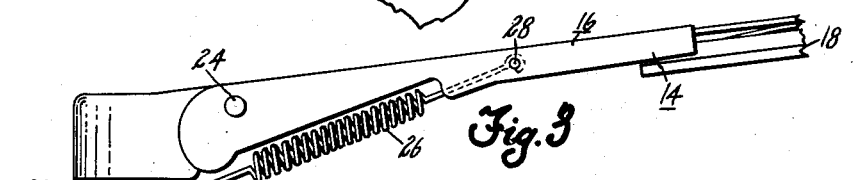
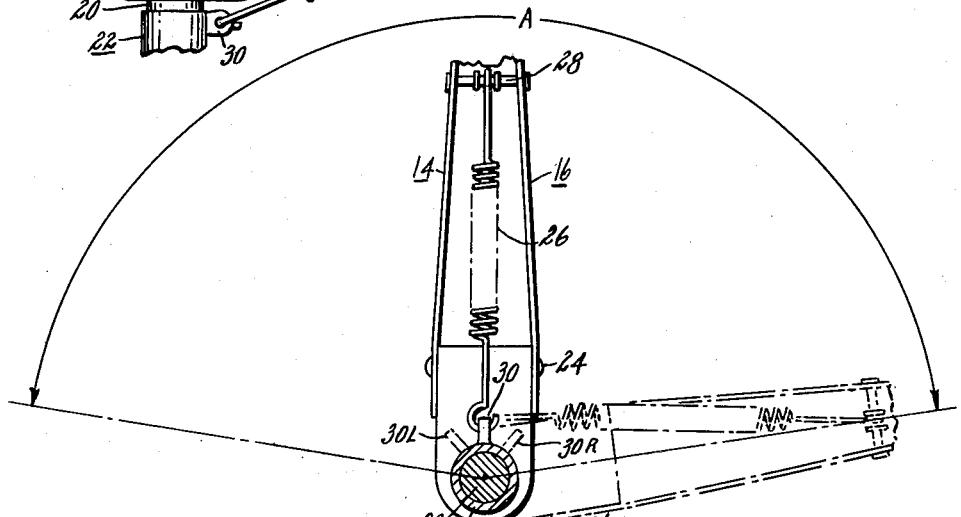
INVENTOR.
CYRIL T. WALLIS
BY George H. Strickland
HIS ATTORNEY United States Patent Office 2,790,990
Patented May 7, 1957

2,790,990
WINDSHIELD WIPER ARM ASSEMBLY

Cyril T. Wallis, Brockport, N. Y., assignor to General Motors Corporation, Detroit, Mich., a corporation of Delaware Application October 15, 1953, Serial No. 386,199

7 Claims. (Cl. 15—255)

This invention pertains to windshield wiper arm assemblies, and particularly to a wiper arm assembly for curved vehicle transparencies.

Curved vehicular transparencies are now used by the majority of automobile manufacturers. In the future, this trend will, undoubtedly, continue and the curvature will become more pronounced. The necessity of adequate windshield cleaning is apparent, and inasmuch as the windshield surface will "wrap around" the sides of the vehicle, means must be provided for cleaning this portion of the windshield. This invention pertains to a wiper arm assembly adapted to wipe such a curved transparency. Accordingly, among my objects are the provision of means for varying the spring tension of a wiper arm assembly so as to obtain substantial uniform wiping pressure over a compound curved surface; and the further provision of a windshield wiper arm assembly including means for compensating for the uneven pressure on a wiper blade when used to wipe a curved vehicular transparency.

The aforementioned and other objects are accomplished in the present invention by providing spring means for a wiper arm assembly, the tension of the spring means being automatically varied upon oscillation of the wiper arm. Specifically, this invention contemplates a windshield wiper arm assembly wherein the conventional spring for applying tension to the wiper blade so as to maintain the same in contact with the windshield, is mounted so that it is variably stressed during oscillatory wiper movement. Thus, one end of the spring is attached to the wiper arm, and the other end of the spring is attached to a stationary bushing which rotatably supports a wiper arm shaft. In this manner, the spring tension on the wiper arm is varied during oscillatory movement of the shaft so that a substantially constant pressure is exerted by the wiper blade on the transparency irrespective of the curved transparency with which it is associated.

Further objects and adavntages of the present invention will be apparent from the following description, reference being had to the accompanying drawing wherein a preferred embodiment of the present invention is clearly shown.

In the drawing:

Fig. 1 is a fragmentary view in elevation of a motor vehicle incorporating a wiper arm assembly of this invention.

Fig. 2 is a fragmentary view in elevation of the "wrap around" vehicular transparency and wiper arm of this invention.

Fig. 3 is a fragmentary view in elevation of the wiper arm assembly.

Fig. 4 is a fragmentary view of the wiper arm assembly illustrating the mode of operation.

With particular reference to Fig. 1, it may be seen that the vehicular transparency 10, in this case a windshield, includes a front portion 11 and "wrap around" side portions, only one, 12, of which is shown in the drawing. The configuration of the windshield surface is such that the side portions thereof are disposed in substantially parallel planes, which planes are located at an angle of substantially 90° to the plane of the front portion 11. It will be appreciated that from the nature of the curved surface, a single wiping element of conventional design could not be used to clean a sufficient portion of the transparency. Accordingly, the cleaning means for this transparency comprises a main blade assembly 13 and an auxiliary blade assembly 14 for each half of the transparency, which blades are operated in tandem on each half of the windshield so as to clean sections of both the front and side portions thereof. This arrangement forms no part of this invention and is more fully disclosed and claimed in copending application, Serial No. 377,436, filed August 31, 1953, in the name of John B. Dyer, et al.

With reference to Figure 2, it may be seen that the auxiliary blade 14 is adapted to clean sections of the front portion 11 as well as the side portion 12 of the windshield 10. Inasmuch as the front and side portions 11 and 12 are located in planes separated by an angle of substantially 90°, it will be readily apparent that some means must be provided to assure a uniform pressure between the blade and the windshield surface to obtain adequate cleaning. In accordance with this invention and with reference to Figures 3 and 4, it may be seen that the auxiliary blade assembly 14 includes a wiper arm 16, which carries a flexible wiping blade 18, which may be of the type shown in United States Patent 2,596,063, Anderson.

The wiper arm 16 is connected to oscillate with a wiper arm shaft 20 that is rotatably supported within a bushing 22. The bushing 22, in a conventional manner, is attached to a portion of the vehicle cowl structure. Moreover, from an inspection of Figure 3, it may be seen that the wiper arm 16 comprises two parts which are pivotally joined at 24 so that the movement imparted to the wiping blade, or element, 18 may be a compound motion made up of oscillatory movement about the shaft 20 and pivotal movement about the connection 24.

A spring 26 is employed to urge the wiper arm assembly against the surface of the curved transparency. One end of the spring 26 is attached at 28 to the wiper arm 16, and the other end of the spring is attached to the stationary bushing 22 at 30. As the point or hook 30 is stationary, it is readily apparent that upon oscillatory movement of the shaft 20 and the wiper arm 16, the tension of the spring 26 will be automatically varied. Moreover, it has been found that by varying the tension of the spring 26, the wiping blade 18 may be made to follow the curvature of the transparency 10 in the same manner as is accomplished by tilting or "rocking" the wiper arm shaft, as is disclosed and claimed in my copending application, Serial No. 376,647, filed August 26, 1953.

In the arrangement shown in full lines in Figure 4, the hook 30 on the bushing 22 is positioned so that the tension of the spring 26 will be a minimum when the wiper arm 16 is in the vertical position, or at the midpoint of its oscillatory arc, which is indicated by the angle A in Fig. 4. However, it may be seen that as the wiper arm 16 moves toward either end of the angle A, the tension imposed on the arm 16 by the spring 26 is increased so as to compensate for the windshield curvature. It will be appreciated that from an inspection of Figure 2, it may be seen that the bushing 22 is located at a position which substantially bisects the angle between the front and side portions 11 and 12 of the windshield. Accordingly, as the wiper arm assembly 14 moves from the vertical position toward either end of its normal stroke, more tension is imposed upon the wiper arm to compensate for the fact that the windshield surface "drops off," so that a substantially uniform pressure is exerted on the transparency by the wiper blade throughout its arcuate motion.

With particular reference to Fig. 4, it should be noted that the hook, or stationary anchor point 30, may be positioned to the right or left, 30R and 30L, respectively, of the full line position in Figure 4 in order to obtain a greater spring tension on one end of the arc of wiper movement than on the other end. Either of these arrangements may be more feasible than the one depicted by full lines in Figure 4, where the wiper arm assembly cannot be mounted at the medial point between the front and side portions of the curved transparency.

From the foregoing it is apparent that the present invention provides an exceedingly simple and economical arrangement for maintaining substantially uniform pressure between a wiper blade and a curved vehicular transparency. Moreover, the arrangement disclosed herein is versatile in that it may be modified within the scope of this invention so as to obtain substantially uniform wiping pressure between a blade and a compound curved surface of virtually any type and configuration.

While the embodiment of the present invention as herein disclosed, constitutes a preferred form, it is to be understood that other forms might be adopted.

What is claimed is as follows:

1. In combination, a curved vehicular transparency having front and side portions located in different planes, a cleaner for said transparency including an oscillatable driving shaft, an arm and a wiping element, said arm including a socket section connected for oscillation with said driving shaft and an outer section pivotally connected to the socket section and carrying said wiping element, and a spring, one end of which is connected to said arm for movement with said arm and said wiping element and the other end of which is stationary for maintaining a substantially constant pressure between said wiping element and said transparency during its oscillatory movement.

2. In combination, a curved vehicular transparency having portions located in different planes, a cleaner for said transparency including an oscillatable driving shaft, an arm with a wiping element, said arm including a socket section connected for oscillation with said driving shaft and an outer section pivotally connected to the socket section and carrying said wiping element, a stationary member within which said oscillatable shaft is rotatably supported, and a spring, one end of which is attached to said arm for movement therewith and the other end of which is attached to said stationary member whereby irrespective of the plane of said vehicle transparency, a substantially uniform pressure will be exerted on said transparency by said wiping element.

3. As an article of manufacture, a wiper arm assembly comprising a wiper arm, a wiper blade carried by said wiper arm, an oscillatable driving shaft operatively associated with said wiper arm for imparting movement thereto, a stationary member within which said shaft is rotatably supported, and a spring, one end of which is attached to the wiper arm and the other end of which is attached to said stationary member at a point spaced from the axis of said shaft, whereby during oscillatory movement of the wiper shaft and wiper arm, the tension exerted on said wiper arm by said spring will be varied.

4. The combination set forth in claim 3 wherein the point to which one end of the spring is attached is located so that tension of said spring is a minimum when the wiper arm is at the mid-point of its stroke.

5. The combination set forth in claim 3 wherein said point is to one side of the mid-point position of said wiper arm so that said spring is under greater tension when the wiper arm is moved in one direction than when it is moved in the other direction from the mid-point position.

6. A wiper assembly comprising, a stationary bushing, an oscillatable driving shaft journaled in said bushing, a wiper arm operatively connected to said shaft including two pivotally connected portions, and a spring, one end of which is attached to one portion of said wiper arm and the other end of which is attached to said stationary bushing at a point spaced from the axis of said shaft whereby during oscillatory motion of said shaft and arm, the tension of said spring will be varied.

7. A wiper assembly comprising, a stationary bushing, an oscillatable driving shaft journaled in said bushing, a wiper arm including pivotally connected inner and outer portions, the inner portion being operatively connected to said shaft for oscillation therewith, a wiper blade carried by the outer portion of said wiper arm, and a spring, one end of which is attached to the outer portion of said wiper arm and the other end of which is attached to said stationary bushing at a point radially spaced from the axis of said shaft, whereby during oscillatory motion of the shaft and said wiper arm the tension exerted on said wiper arm by said spring will be varied.

References Cited in the file of this patent

UNITED STATES PATENTS

| | | |
|---|---|---|
| 1,895,273 | Wolf | Jan. 24, 1933 |
| 1,982,624 | Barker | Dec. 4, 1934 |
| 2,191,423 | Browne | Feb. 29, 1940 |
| 2,401,961 | Rappl | June 11, 1946 |
| 2,412,319 | Carey | Dec. 10, 1946 |
| 2,619,668 | Sivacek | Dec. 2, 1952 |